United States Patent Office 3,402,189
Patented Sept. 17, 1968

3,402,189
PROCESS FOR PREPARING TRICYCLOHEXYL
TIN HYDROXIDE
Joseph G. Natoli, Middlesex, N.J., assignor to M&T
Chemicals Inc., New York, N.Y., a corporation of
Delaware
No Drawing. Filed Mar. 29, 1966, Ser. No. 538,219
7 Claims. (Cl. 260—429.7)

ABSTRACT OF THE DISCLOSURE

The novel process of this invention for preparing tricyclohexyltin hydroxide $(C_6H_{11})_3SnOH$ may comprise maintaining a reaction mixture containing cyclohexyl magnesium halide $(C_6H_{11})MgX$ and a tin tetrahalide $SnX_4$ in molar ratio of 3:1 wherein X is an active halide selected from the group consisting of chloride and bromide; maintaining in said reaction mixture a hydrocarbon solvent and a solvent-diluent compound selected from the group consisting of an aliphatic ether, tetrahydrofuran, tetrahydropyran, 2-methyltetrahydrofuran, 2-ethoxytetrahydropyran, tetrahydrofurfuryl ethyl ether, dihydropyran, and N-methyl-morpholine; maintaining said reaction mixture for time sufficient to form tricyclohexyltin halide $(C_6H_{11})_3SnX$; admixing said reaction mixture and aqueous medium thereby hydrolyzing said reaction mixture; separating from said hydrolyzed reaction mixture an organic layer containing said hydrocarbon solvent, said solvent-diluent, and said tricyclohexyltin halide $$(C_6H_{11})_3SnX$$

causticizing said organic layer thereby forming organic solution of tricyclohexyltin hydroxide; separating said organic solution; cooling said separated organic solution thereby precipitating substantially pure tricyclohexyltin hydroxide; and recovering said tricyclohexyltin hydroxide.

---

This invention relates to a novel process for the preparation of organotin compounds. More particularly it relates to a process characterized by ease of operation and by high yields of pure product.

Prior attempts to produce certain organotin compounds typified by tricyclohexyltin hydroxide include those wherein as a first step a cyclohexyl Grignard compound RMgX (typified by cyclohexyl magnesium chloride or bromide) may react with tin tetrahalide $SnX_4$ (typified by tin tetrachloride) to produce $R_3SnX$ e.g. tricyclohexyltin chloride. This reaction may commonly have been conducted in the presence of certain additives, diluents, or solvents typified by tetrahydrofuran. Recovery of this intermediate $R_3SnX$ product in pure form has commonly required distillation at moderately high temperature to remove the additive tetrahydrofuran and to permit recovery of this expensive material in economical quantities before further reaction to prepare the hydroxide. Typically this has necessitated use of expensive distillation equipment with attendant deterioration of intermediate $R_3SnX$ product at the elevated temperature of operation. Subsequent operations include the transfer of molten product to a crystallizing operation wherein it may for example be dissolved in appropriate solvent, typically isopropyl alcohol, from which it may be recrystallized by cooling.

As is apparent to those skilled-in-the-art, processes of this type may be undesirably characterized by special equipment and by the need for special handling. Distillation equipment required may be expensive to maintain and distillation operations may require extended periods of time. Additional problems in materials handling have prevented economical production of compounds such as tricyclohexyl tin hydroxide in reasonable yields by prior art processes.

It is an object of this invention to provide a novel process for the preparation of organotin compounds. It is another object of this invention to provide a process for preparing tricyclohexyltin hydroxide particularly characterized by ease of operation and freedom from distillation. Other objects may be apparent to those skilled-in-the-art upon inspection of the following description.

In accordance with certain of its aspects, the novel process of this invention for preparing tricyclohexyltin hydroxide $(C_6H_{11})_3SnOH$ may comprise maintaining a reaction mixture containing cyclohexyl magnesium halide $(C_6H_{11})MgX$ and a tin tetrahalide $SnX_4$ in molar ratio of 3:1 wherein X is an active halide selected from the group consisting of chloride and bromide; maintaining in said reaction mixture a hydrocarbon solvent and a solvent-diluent compound selected from the group consisting of an aliphatic ether, tetrahydrofuran, tetrahydropyran, 2-methyltetrahydrofuran, 2-ethoxytetrahydropyran, tetrahydrofurfuryl ethyl ether, dihydropyran, and N-methyl-morpholine; maintaining said reaction mixture for time sufficient to form tricyclohexyltin halide $$(C_6H_{11})_3SnX$$

admixing said reaction mixture and aqueous medium thereby hydrolyzing said reaction mixture; separating from said hydrolyzed reaction mixture an organic layer containing said hydrocarbon solvent, said solvent-diluent, and said tricyclohexyltin halide $(C_6H_{11})_3SnX$; causticizing said organic layer thereby forming organic solution of tricyclohexyltin hydroxide; separating said organic solution; cooling said separated organic solution thereby precipitating substantially pure tricyclohexyltin hydroxide; and recovering said tricyclohexyltin hydroxide.

In practice of the process of this invention, the cyclohexyltin hydroxide product $(C_6H_{11})_3SnOH$ which may be prepared in high yield by practice of this invention may include products wherein the cyclohexyl group, herein designated $C_6H_{11}$—, may be inertly substituted.

Typical illustrative products which may be formed by the process of this invention may include:

tri(2-methylcyclohexyl) tin hydroxide
tri(2-butylcyclohexyl) tin hydroxide
tri(2-phenylcyclohexyl) tin hydroxide
tri(2,4,6-trimethylcyclohexyl) tin hydroxide
tri(3,5-dimethylcyclohexyl) tin hydroxide
tri(4-t-butylcyclohexyl) tin hydroxide
tri(2-isopropyl-5-methylcyclohexyl) tin hydroxide
tri(2,5-dimethylcyclohexyl) tin hydroxide
tri(3,4-dimethylcyclohexyl) tin hydroxide In the first step of the process of this invention, tin tetrahalide, $SnX_4$, may be reacted with cyclohexyl Grignard compound $(C_6H_{11})MgX$ according to the following reaction:

$$3(C_6H_{11})MgX + SnX_4 \rightarrow (C_6H_{11})_3SnX + 3MgX_2 \qquad (I)$$

The tin tetrahalide which may be used in practice of this invention may be $SnX_4$ wherein X may be an active halide selected from the group consisting of chloride and bromide. Preferably $SnX_4$ may be tin tetrachloride, $SnCl_4$.

The Grignard reagent which may be used in practice of this invention, preferably cyclohexyl magnesium chloride (and including Grignard reagents containing inertly substituted cyclohexyl radicals as noted supra) may be prepared by the reaction of a cyclohexyl halide with magnesium according to the following reaction:

$$(C_6H_{11})X + Mg \rightarrow (C_6H_{11})MgX \qquad (II)$$

This reaction may preferably be carried out under an inert atmosphere, e.g. nitrogen gas, in the presence of a solvent-diluent compound, typically in aliphatic ether such as a di-lower alkyl ether, typically diethyl ether, di-n-butyl ether, etc. or a compound Q as hereinafter described. Various initiators may be present to facilitate formation of the Grignard reagent.

The compound Q, as this expression is used herein for the purpose of brevity, may include cyclic ethers containing 5–6 members in the ring with at least one hydrogen atom attached to each carbon atom in the ring and having the formula:

wherein X is a methylene group or an N-alkyl group; R″ is an unsubstituted saturated divalent aliphatic hydrocarbon radical; R′ is an ethylene radical, an ethylenically unsaturated divalent hydrocarbon radical, a methylene radical, or =CHR‴ (R‴ being hydrogen or an aliphatic radical); and O is oxygen. When X is N-alkyl, the ring contains 6 members with X and O in a position 1:4 with respect to each other.

Typical compounds may include tetrahydrofuran, tetrahydropyran, 2 - methyltetrahydrofuran, 2 - ethoxytetrahydropyran, tetrahydrofurfuryl ethyl ether, dihydropyran, and N-methylmorpholine. The compound Q may bear inert substituent groups, i.e. groups which are not reactive with organomagnesium halides, or with any of the components products of the reaction mixtures of the present process. Illustrative inert substituents may include substituted and unsubstituted alkyl, aryl, alkoxy, and aryloxy groups (including those bearing substituents thereon which are unreactive to other components of the reaction mixture as herein specified). Where nitrogen replaces a carbon atom in the ring at X, the nitrogen atom must be substituted with a group, such as an alkyl group, which is unreactive to the reactants or reaction products.

It is a characteristic of compound Q that the oxygen is available for electron donation, i.e. the free $\pi$-electrons present on the oxygen are available for co-ordination with the Grignard reagent. Any large blocking groups on the carbon atoms adjacent to the ring oxygen may impair the availability of these electrons and the reactivity of the compound for forming a complex and assisting in the reaction. In addition to the compounds listed above as being suitable for compound Q, other equivalent compounds satisfying the requirements for this complexing agent and solvent will be apparent to those skilled-in-the-art from the present specification. Since compound Q may also function as a solvent, a compound Q which has a high melting point may be used in practice of this invention, but if it is used as solvent, the high melting point (e.g. above 90° C.) may cause difficulty in carrying out the reaction.

The Grignard reagent formed by the process of e.g. Equation II supra may be preferably in the form of a solution of its complex with the ether or the compound Q, e.g. as a solution of $(C_6H_{11})MgX \cdot Q$ in Q. For the purpose of convenience, the equations herein may be written without reference to the ether or compound Q which may be present.

In practice of the process of this invention, the reaction between the tin tetrahalide $SnX_4$ and the Grignard reagent, e.g. $(C_6H_{11})MgX$ may be carried out in an appropriate reaction vessel. Preferably the $SnX_4$, in amount of 975 parts (3.75 moles), may be added together with appropriate hydrocarbon solvent, typically a hydrocarbon having a boiling point of 30° C.–150° C., say about 137° C., including e.g. toluene, heptane, cyclohexane, etc. Hydrocarbon may be present in amount of 1000–2000 parts, say 1460 parts. The preferred hydrocarbon may be xylene which may be added in amount of 10–20 moles, say 15 moles, per mole of $SnX_4$ to be consumed during the reaction. In the preferred embodiment of the process of the invention, the tin tetrahalide $SnX_4$ and the hydrocarbon solvent may be added to the reaction vessel in the form of a solution of tin tetrahalide in the hydrocarbon solvent.

To the preferably well agitated reaction mixture containing $SnX_4$, there may be slowly added 4530–5210 parts, say 4870 parts (11.25 moles) of the Grignard reagent $(C_6H_{11})MgX$ including 3035–3491 parts, say 3263 parts of compound Q. Typically the $(C_6H_{11})MgX$ may be added to the reaction mixture over 60–210 minutes, say 120 minutes. Preferably the exothermic reaction mixture may be maintained at 25° C.–105° C., more preferably less than 90° C., say at 80° C. Reaction may, if desired, be carried out at 30° C.–40° C. During the reaction, product $(C_6H_{11})_3SnX$ may be formed together with a precipitate of $MgX_2$ in accordance with Equation I supra.

The reaction mixture may then be hydrolyzed to liberate the product $(C_6H_{11})_3SnX$. Typically this may be effected by diluting the mixture at 30° C.–50° C., say 40° C., with 2000–2500 parts, say 2330 parts of water, preferably containing electrolyte such as hydrochloric acid in the amount of 2%–8%, say 5%, by weight.

The organic layer which separates may be found to contain: (a) hydrocarbon solvent, typically xylene; (b) solvent-diluent, typically tetrahydrofuran; (c) tricyclohexyltin halide; and (d) by-product tetracyclohexyltin together with (e) by-product dicyclohexyl tin dihalide. This organic layer may be separated from the reaction mixture as by decantation. The residual aqueous portion may include magnesium chloride in essentially aqueous solution.

In practice of the novel process of this invention, the separated organic reaction layer may preferably be causticized by adding thereto a strong alkaline agent, typically potassium hydroxide, sodium hydroxide, etc. Preferably caustization may be effected by adding alkaline agent in 5%–100%, say 50%, aqueous solution added in amount of 0.2–0.4 part, say 0.28 part, per part of organotin halide in said organic layer.

Causticization may be effected by maintaining the caustic solution and the separated organic layer in contact preferably for 1–4 hours, say 3 hours, and preferably by heating to 25° C.–75° C., typically 60° C. During this period, the tricyclohexyl tin halide which may be present may be converted to a tricyclohexyltin hydroxide:

$$(C_6H_{11})_3SnX + NaOH \rightarrow (C_6H_{11})_3SnOH + NaCl \quad \text{(III)}$$

If desired, additional water may be added to the causticized reaction mixture in amount sufficient to dissolve the salt product, typically 2.8–5.6 parts, say 2.8 parts of water per part of salt, typically sodium chloride. If this be done, the aqueous salt solution may be readily separated.

The insoluble dicyclohexyltin oxide may be removed from the reaction mixture as by filtration to recover dicyclohexyltin oxide by-product.

The remaining reaction mixture, containing organic hydrocarbon solvent, solvent-diluent compound, and tricyclohexyl tin hydroxide may be cooled to $-10°$ C. to 25° C., typically 0° C., to effect precipitation of substantially stoichiometric quantities of tricyclohexyltin hydrocarbon. Tetracyclohexyl tin present may remain in solution in the mixture of organic hydrocarbon solvent and solvent-diluent.

The tricyclohexyltin hydroxide may be recovered as by filtration in amount of 900–1100 parts, say 970 parts representing a yield of 62%–76%, say 67% (based on tin).

The crude product may have a melting point of 221° C.–223° C.

Typically the analysis may be as set forth in the following table:

| Component | Calculated, percent | Found, percent |
|---|---|---|
| Tin | 30.82 | 31.00 |
| Chlorine | 0 | 0 |
| Karl Fischer | 4.67 | 4.65 |

It is a particular feature of the tricyclohexyltin hydroxide prepared in accordance with the process of this invention that it is pure material which need not be further treated or recrystallized. It may normally be of at least about 95% purity and commonly greater than 98% purity. It may be used for substantially any desired use without further treatment or purification. Infrared analysis may confirm the purity of the product.

Practice of this invention may be observed by reference to the following illustrative example of a preferred embodiment wherein all parts are parts by weight unless otherwise specified.

Example 1

In this example which represents practice of the invention, cyclohexylmagnesium chloride Grignard reagent may be prepared by charging 545 parts of magnesium turnings to a reaction vessel which may be purged with nitrogen gas. 621 parts of tetrahydrofuran may be added together with an initiation mixture containing 57 parts of cyclohexyl bromide and 29.6 parts of cyclohexyl chloride. To the reaction mixture, there may be added slowly a mixture containing 2538 parts of cyclohexyl chloride and 5087 parts of tetrahydrofuran with agitation. During addition, external heating may be applied and maintained until the temperature is raised to about 75° C. Thereafter reaction may proceed exothermically with pot temperature reaching as high as 78° C. over the course of 300 minutes. External heating may be withdrawn and reaction may further continue for about 60 minutes. The reaction mixture containing 8035 parts of Grignard compound may then be cooled to room temperature.

$$(C_6H_{11})Cl + Mg \rightarrow (C_6H_{11})MgCl \qquad (IV)$$

A charge solution containing 975 parts of tin tetrachloride and 460 parts of xylene may be prepared; and 25% of this mixture (359 parts) may be charged into a reaction vessel together with 1000 parts of additional xylene.

The remaining tin tetrachloride solution (1076 parts) and 66% of the cyclohexylmagnesium chloride Grignard reagent (3246 parts) may then be added to the reaction vessel simultaneously and separately over approximately 150 minutes. The temperature may rise to 80° C. during addition. The remaining 34% of the Grignard compound (1624 parts) may then be added to the reaction mixture over about 90 minutes at about 75° C.–80° C.

The reaction mixture may then be maintained at 75° C.–85° C., under gentle reflux, for one hour during which time the following reaction may occur:

$$3(C_6H_{11})MgCl + SnCl_4 \rightarrow (C_6H_{11})_3SnCl + 3MgCl_2 \qquad (V)$$

At the end of 3 hours of reaction, there may be observed a precipitate of sodium chloride and dicyclohexyltin oxide. There may then be added to the reaction mixture 607 parts of water which may be sufficient to dissolve the precipitated sodium chloride. The upper organic layer, containing a precipitate of dicyclohexyl tin oxide, may be decanted from the lower aqueous solution containing sodium chloride. The organic layer may be filtered to yield dicyclohexyltin oxide by-product.

The remaining organic solution may be cooled to 0° C.–10° C. to precipitate tricyclohexyl tin hydroxide. Filtration may permit attainment of 970 parts by weight of tricyclohexyltin hydroxide (67.4% yield) having a melting point of 221.5° C.–223° C. (literature reports 220° C.–222° C.). Analysis of this product may indicate that it is 99.7% pure. Tin content may be 31.00%; chloride content may be 0%; and Karl Fischer, 4.65%.

Although this invention has been disclosed by reference to preferred illustrative examples, it will be apparent to those skilled-in-the-art that various modifications and changes may be made thereto which fall within the scope of this invention.

What is claimed is:

1. The process for preparing tricyclohexyltin hydroxide $(C_6H_{11})_3SnOH$ which comprises maintaining a reaction mixture containing cyclohexyl magnesium halide $$(C_6H_{11})MgX$$

and tin tetrahalide $SnX_4$ in molar ratio of 3:1 wherein X is an active halide selected from the group consisting of chloride and bromide; maintaining in said reaction mixture (a) a hydrocarbon solvent and (b) a solvent-diluent compound selected from the group consisting of an aliphatic ether, tetrahydrofuran, tetrahydropyran, 2-methyltetrahydrofuran, 2-ethoxytetrahydropyran, tetrahydrofurfuryl ethyl ether, dihydropyran, and N-methylmorpholine; maintaining said reaction mixture for time sufficient to form tricyclohexyltin halide $(C_6H_{11})_3SnX$; admixing said reaction mixture and aqueous medium thereby hydrolyzing said reaction mixture; separating from said hydrolyzed reaction mixture an organic layer containing hydrocarbon solvent, said solvent-diluent, and said tricyclohexyltin halide $(C_6H_{11})_3SnX$; causticizing said organic layer thereby forming organic solution of tricyclohexyltin hydroxide; separating said organic solution; cooling said separated organic solution thereby precipitating tricyclohexyltin hydroxide; and recovering said tricyclohexyltin hydroxide.

2. The process for preparing tricyclohexyltin hydroxide as claimed in claim 1 wherein X is chloride.

3. The process for preparing tricyclohexyltin hydroxide as claimed in claim 1 wherein said reaction mixture is maintained at 25° C.–105° C. during said reaction.

4. The process for preparing tricyclohexyltin hydroxide as claimed in claim 1 wherein said hydrocarbon solvent is xylene.

5. The process for preparing tricyclohexyltin hydroxide as claimed in claim 1 wherein said solvent-diluent compound is tetrahydrofuran.

6. The process for preparing tricyclohexyltin hydroxide as claimed in claim 1 wherein said organic solution is cooled to −10° C. to 25° C. during precipitation of tricyclohexyltin hydroxide.

7. The process for preparing tricyclohexyltin hydroxide which comprises maintaining a reaction mixture containing cyclohexyl magnesium chloride and tin tetrachloride in molar ratio of 3:1, maintaining in said reaction mixture for time sufficient to form tricyclohexyltin chloride; admixing said reaction mixture and aqueous medium thereby hydrolyzing said reaction mixture; separating from said hydrolyzed reaction mixture an organic layer containing xylene, tetrahydrofuran, and tricyclohexyltin chloride; causticizing said organic layer thereby forming organic solution of tricyclohexyltin hydroxide; separating said organic solution; cooling said separated organic solution thereby precipitating tricyclohexyltin hydroxide; and recovering said tricyclohexyltin hydroxide.

References Cited

UNITED STATES PATENTS 3,082,230   3/1963   Dorfelt et al. _____ 260—429.7
3,355,468   11/1967  Hirshman et al. ____ 260—429.7

TOBIAS E. LEVOW, Primary Examiner.

W. F. W. BELLAMY, Assistant Examiner.